United States Patent [19]

Griese et al.

[11] Patent Number: 5,314,629
[45] Date of Patent: May 24, 1994

[54] METHOD AND SYSTEM FOR TREATING DRINKING WATER

[75] Inventors: Mark H. Griese, Evansville; Ronald S. Bialosky, Newburgh, both of Ind.

[73] Assignee: Evansville Water & Sewer Utility, Evansville, Ind.

[21] Appl. No.: 972,795

[22] Filed: Nov. 6, 1992

[51] Int. Cl.$^5$ .............................................. C02F 1/76
[52] U.S. Cl. .................................. 210/754; 210/757; 210/202; 210/206
[58] Field of Search ............... 210/754, 757, 758, 206, 210/207, 252, 257.1, 259, 295, 800, 804, 806, 199, 202, 207

[56] References Cited

U.S. PATENT DOCUMENTS

| | | | |
|---|---|---|---|
| 3,915,637 | 10/1975 | Taylor | 23/230 B |
| 3,983,033 | 9/1976 | Le Latour | 210/49 |
| 4,066,748 | 1/1978 | Lietard et al. | 424/147 |
| 4,297,333 | 10/1981 | Crawford et al. | 210/756 |
| 4,343,706 | 8/1982 | Etzel et al. | 210/667 |
| 4,566,986 | 1/1986 | Waldmann | 252/175 |
| 4,574,036 | 3/1986 | Henriot | 203/39 |
| 4,693,832 | 9/1987 | Kurst | 210/754 |
| 4,844,800 | 7/1989 | Brucker | 210/195.3 |
| 4,983,306 | 1/1991 | Deininger et al. | 210/724 |
| 5,011,613 | 4/1991 | Feray et al. | 210/754 |
| 5,023,012 | 6/1991 | Buchan et al. | 25/181 |

OTHER PUBLICATIONS

"Pilot Plant Optimization of the Chlorine Dioxide Treatment Process For Disinfection By-Product Reduction"-Mark H. Griese, American Water Works Association Convention-Jun. 23-27, 1991.
"Controlling Disinfection By-Products with Alternative Disinfectants"-American Water Works Association Convention-Jun. 23-27, 1991.
"Using Reducing Agents to Eliminate Chlorine Dioxide and Chlorite Ion Residuals in Drinking Water"-Mark H. Griese et al.-Journal AWWA May 1991, pp. 56-61.

Primary Examiner—Neil McCarthy
Attorney, Agent, or Firm—Rankin, Hudak & Hill

[57] ABSTRACT

The present invention provides a new and improved method for treating drinking water in a drinking water treatment plant that provides for substantial or complete removal of chlorine dioxide and an associated by-product from water when chlorine dioxide is used as an initial disinfectant and/or chemical oxidizing agent. More particularly, the present invention provides a means for decreasing undesirable residual amounts of chlorine dioxide and chlorite ion using ferrous chloride. The novel process includes the addition of chlorine dioxide for disinfection/oxidation of the process water, a first sedimentation basin for processing the water and/or providing adequate chlorine dioxide contact time, the addition of ferrous chloride for treating the water and removing residual amounts of chlorine dioxide and chlorite ion, a source of chlorine (or alternative oxidizing agent) to precipitate residual ferrous iron, a second sedimentation basin, or similar settling mechanism, for processing the water after it has been mixed and reacted with the ferrous chloride and the oxidizing agent, and a filter for processing the water following the second sedimentation basin.

14 Claims, 1 Drawing Sheet

METHOD AND SYSTEM FOR TREATING DRINKING WATER

This invention was made with government support under contract number CR-816837-01-0 awarded by the U.S. EPA. The U.S. government has certain rights in the invention.

TECHNICAL DISCLOSURE

The present invention concerns a method and means of treating drinking water. More particularly, the present invention concerns a method and system for treating drinking water to decrease unwanted residual concentrations of chlorine dioxide and chlorite ion using ferrous chloride ($FeCl_2$).

BACKGROUND

Generally, water treatment plants utilized for the production of drinking water are designed as either groundwater or surface water facilities.

Groundwater facilities, as the name would imply, are those systems that use groundwater as their source of supply (i.e., wells). Prior to designing groundwater treatment plants, extensive laboratory analyses are conducted to determine what, if any, chemical contaminants are present in the groundwater, and if removal of any of these contaminants is necessary for the water to be safe for public use, meet regulatory standards, and be aesthetically acceptable. Since most groundwater systems are inherently protected by the filtering ability of the surrounding soil, water quality characteristics remain relatively constant and treatment plant construction and process design are based upon the initial laboratory analyses. Although many of these facilities may utilize some of the same treatment processes employed by surface water systems, site specific conditions may require the incorporation of select chemical treatment processes.

By contrast, surface water facilities utilize some form of surface water as their source of supply (i.e., lakes, rivers, streams, reservoirs, etc.) and are generally much less specific in design. Due to the vulnerability of these systems to source water quality variations from accidental chemical spills, upstream runoff, and diverse seasonal conditions, surface water facilities are designed and constructed in a more generic fashion that provides for the removal of a wide variety of potential contaminants. In general, surface water facilities incorporate the same basic principles for water treatment processing, and utilize the same or similar chemical and physical methods for enhanced contaminant removal. Additional chemicals, with permanent or portable chemical feed equipment, may also be provided for the removal of specific contaminants that have historically appeared in the source water on an occasional basis.

Most surface water facilities employ the use of screens to prevent large debris (i.e., branches, aquatic life, etc.) from entering the treatment plant and interfering with equipment and/or processing. Low service pumps are used for transporting the screened source water to the treatment facility. Various chemicals may be added to the source water supply for the purpose of pH adjustment, disinfection, organic matter oxidation, and/or as an aid in the coagulation and removal of solid particles in the water. Mixing chambers called flocculators provide adequate solid-to-solid and solid-to-coagulant contact to create larger, more readily settleable solids that are removed in downstream primary (and possibly secondary) sedimentation basins. The majority of remaining suspended particles are removed by filters which consist of various types of fine aggregate materials (i.e., sand, stone, and/or carbon). Filtered water is stored in basins called clearwells and may be treated with additional chemicals to insure residual disinfectant concentrations in the distribution system. This finished water is then distributed to the customers via high service pumps and a network of distribution piping.

As previously mentioned, one or more oxidizing chemicals may be added to the source water in order to chemically alter or decrease (thru oxidation) the amount of organic matter present in the source water. This oxidation/alteration prevents the organic matter from reacting with other chemicals (i.e., chlorine) added further downstream in the treatment plant and resulting in the production of presently regulated health concern chemicals. One chemical used by some water treatment plants to accomplish this oxidation/alteration process is chlorine dioxide ($ClO_2$).

Initially used as a means of controlling various taste and odor related problems and finished water iron and manganese concentrations, water industry interest in chlorine dioxide as an alternative oxidant/disinfectant increased significantly with the promulgation of the 0.10 mg/L maximum contaminant level (MCL) for total trihalomethanes (TTHMs) in 1979. After being recommended by the U.S. Environmental Protection Agency (USEPA) as a suitable technology for controlling TTHMs in 1983, the use of chlorine dioxide in U.S. water treatment plants was estimated to have tripled by 1986.

While capable of reducing the concentration of TTHMS, the use of chlorine dioxide inherently results in finished water residual concentrations of chlorine dioxide, chlorite ion ($ClO_2^-$) and chlorate ion ($ClO_3^-$), which are, themselves, targeted for future regulatory consideration by the USEPA.

In the article entitled "Using Reducing Agents to Eliminate Chlorine Dioxide and Chlorite Ion Residuals in Drinking Water", American Water Works Association Journal, May 1991, pg. 56–61, there is discussion regarding the possible use of ferrous chloride for the removal of residual chlorine dioxide and related by-products from water. Specifically, there is a discussion of performing jar tests with ferrous chloride for the removal of chlorine dioxide and the by-product chlorite ion. There is not, however, any discussion regarding the effective integration of ferrous chloride into a drinking water treatment facility for this purpose.

SUMMARY OF THE INVENTION

The present invention provides a new and improved method for treating drinking water in a drinking water treatment plant that may provide for the significant reduction of finished water trihalomethane concentrations, improved iron and manganese oxidation, and improved taste and odor reduction. The invention also provides for the substantial or complete removal of residual chlorine dioxide and an associated by-product from water when chlorine dioxide is used as an initial disinfectant and/or chemical oxidizing agent. More particularly, the present invention provides a means for decreasing undesirable residual amounts of chlorine dioxide and chlorite ion using ferrous chloride. Because the invention facilitates the removal of residual chlorine dioxide and chlorite ion, it provides for the use of greater chlorine dioxide dosages or amounts than have traditionally been utilized.

In one preferred embodiment, the invention comprises a water treatment facility and process for converting a source of water into drinking water with lower concentrations of contaminants. The process includes the addition of chlorine dioxide for disinfection/oxidation of the process water, a first sedimentation basin for processing the water and/or providing adequate chlorine dioxide contact time, the addition of ferrous chloride for treating the water and removing residual amounts of chlorine dioxide and chlorite ion, a source of chlorine (or alternative oxidizing agent) to precipitate residual ferrous iron, a second sedimentation basin, or similar settling mechanism, for processing the water after it has been mixed and reacted with the ferrous chloride and an oxidizing agent such as chlorine, and a filter for processing the water following the second sedimentation basin.

Preferably, the chlorine dioxide application point is provided in the treatment facility prior to the water being processed by the first sedimentation basin. Total removal of chlorine dioxide and chlorite ion residuals is achieved using about a threefold to about a thirtyfold weight-to-weight ratio of excess ferrous chloride to that of the total combined chlorine dioxide and chlorite ion residuals present in the water at the point of ferrous chloride application. Preferably, the ferrous chloride is provided for treatment using about a fivefold to about a twentyfold weight-to-weight ratio of excess ferrous chloride to that of the combined chlorine dioxide and chlorite ion residuals present in the water at the point of ferrous chloride application. More preferably, the ferrous chloride is provided for treatment using about a tenfold to about a fifteenfold weight-to-weight ratio of excess ferrous chloride to that of the combined chlorine dioxide and chlorite ion residuals present in the water at the point of ferrous chloride application.

The foregoing and other features of the invention are hereinafter more fully described and particularly pointed out in the claims. The following detailed description and annexed drawing set forth in detail certain illustrative embodiments of the invention; these being indicative, however, of but a few of the various ways in which the principles of the present invention may be employed.

DETAILED DESCRIPTION

Figure 1:
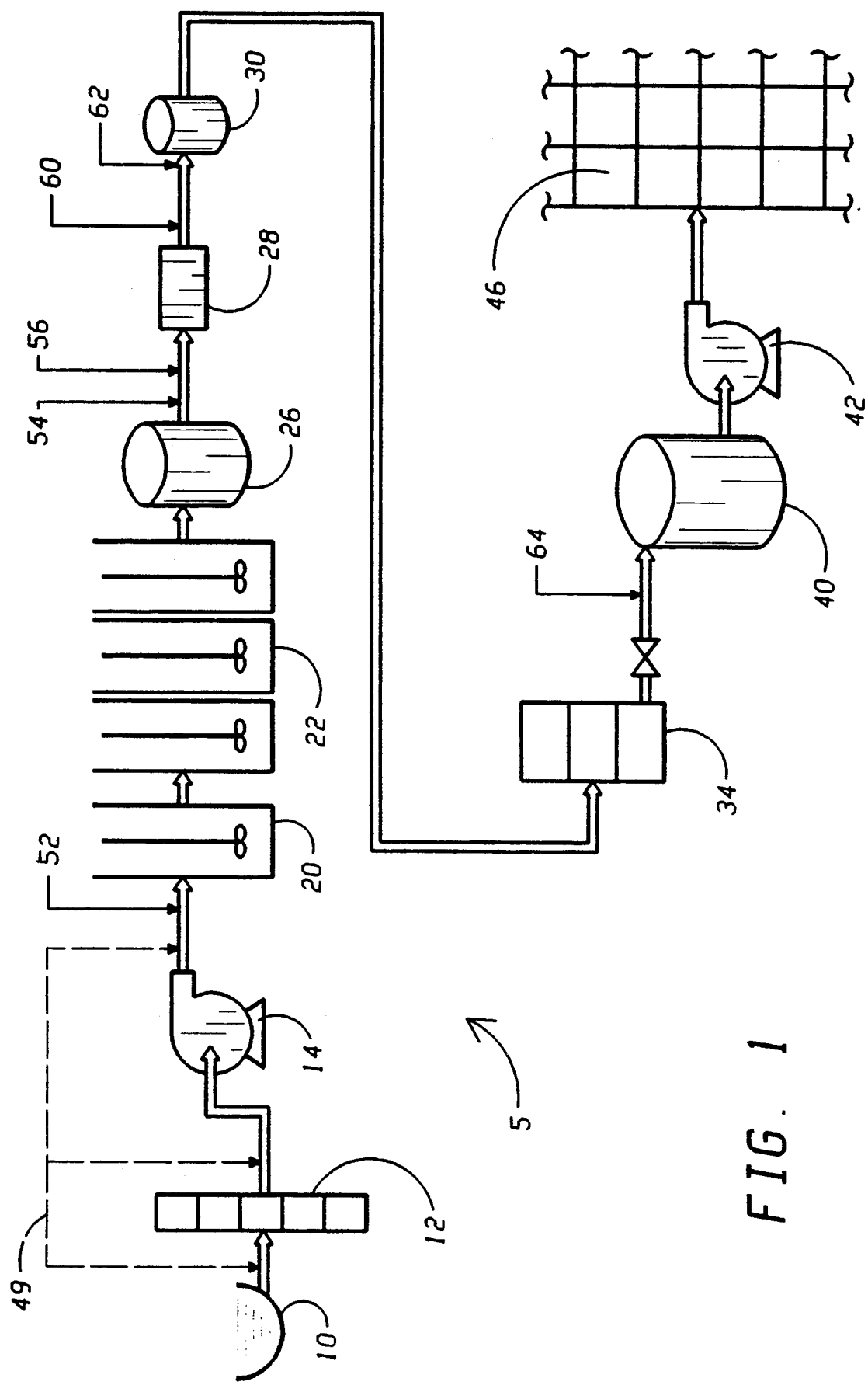
FIG. 1 is a schematic representation of a drinking water treatment facility or plant suitable for use in accordance with the principles of the present invention.

Referring to FIG. 1, there is shown schematically a water treatment facility 5 adapted for use in accordance with the principles of the present invention. The facility comprises a source of water 10 (i.e., lake, river, pond, reservoir or water basin), a screening device 12 and a low service pump 14 for pumping the water to the water treatment facility. The screen 12 serves to remove large pieces of debris (i.e., tree limbs, leaves and aquatic life). After passing through the screen 12, the water is pumped (via the low service pumps 14) to the treatment operation where it passes through a series of compartments providing rapid mix 20 and tapered flocculation 22. Following the flocculation system 22, the water flows into a first (primary) sedimentation basin or clarifier 26. Primary basin 26 permits the removal of solid particles by gravitational settling and also facilitates contact time. After passing through a contact chamber 28 which serves to provide residence time for the water, additional sediment removal is accomplished in a subsequent secondary sedimentation basin or clarifier 30.

After the water has been processed by the secondary sedimentation basin 30, it flows through a filter system 34 which removes the majority of remaining fine particulate matter. Filter system 34 may comprise any one of a variety of conventional filter systems such as those which employ sand, anthracite or other known filtering media.

After being treated by the filter system 34, the water flows into the clearwell 40 where it is then pumped by a high service pump 42 into the water distribution system 46.

Chemicals or treatment materials are added at various points throughout the water treatment facility 5. Specifically, chlorine dioxide, which serves as the primary oxidant and/or disinfectant is added to the facility prior to the screen 12, subsequent to the screen 12, or after the low service pumps 14 as indicated by arrow 49. The chlorine dioxide is generally added to the water at a rate of about 0.1 mg/L to about 10.0 mg/L. Preferably, chlorine dioxide is added at a rate of about 0.5 mg/L to about 5.0 mg/L. Care must be taken to ensure that the chlorine dioxide is thoroughly reacted with the water. A primary basin 26 can help facilitate this contact time and allow the chlorine dioxide to perform its intended function.

A coagulant such as aluminum sulphate (Alum) is added to the water as indicated by arrow 52 just prior to the mixer 20. Alum is generally added at a rate of about 10 mg/L to about 50 mg/L. Lime, caustic soda, or an alternative chemical may be added subsequent to the first sedimentation basin 26 as indicated by arrow 54 for pH adjustment. A pH after this adjustment of about 7.0 is preferred. As indicated by arrow 56, ferrous chloride is added to the water subsequent to the pH adjustment chemical in order to reduce residual concentrations of chlorine dioxide and by-product chlorite ion ($ClO_2^-$).

Chlorine or an alternative oxidizing agent, such as, for example, potassium permanganate is applied as indicated by arrow 60 subsequent to the contactor 28 in order to oxidize excess ferrous chloride to an insoluble form and facilitate its removal in the subsequent secondary sedimentation and filtration steps. When the oxidizing agent comprises chlorine, such chlorine may provide a residual disinfectant concentration. In addition to comprising the addition of a chemical, the oxidizing agent may comprise the mechanical aeration of the water. If chlorine is utilized as the oxidizing agent, it is generally added to provide a residual concentration of from about 0.1 mg/L to about 10 mg/L, and preferably a residual concentration of from about 1 mg/L to about 4 mg/L.

Additional chemicals such as lime, caustic soda, or an alternative chemical may be applied as indicated by arrow 62 prior to the secondary basin 30 for purposes of final pH adjustment. Final chemical treatment may occur after the filter 34 as indicated by arrow 64 with the addition of chlorine or chloramines to provide an adequate residual disinfectant concentration in the distribution system 46. The ferrous chloride is added to the water at a ratio of about a threefold to about a thirtyfold weight-to-weight excess of ferrous chloride to the total combined residuals of chlorine dioxide and chlorite ion present in the water at the point of the ferrous chloride addition. Preferably, the ferrous chloride is provided for treatment using a ratio of about a fivefold to about a twentyfold weight-to-weight excess of ferrous chloride to that of the total combined chlorine dioxide and chlorite ion residuals. More preferably, the ferrous chloride is provided for treatment using a ratio of tenfold to fifteenfold weight-to-weight excess of ferrous chloride to that of the total combined chlorine dioxide and chlorite ion residuals. An example of a suitable source of ferrous chloride is ferrous chloride available from Midland Resources, Inc. of St. Louis, Mo., which contains 27%–35% ferrous chloride.

Applicants have found that the location for the addition of ferrous chloride, and the contact time for which the ferrous chloride needs to be in contact with the process water, are critical components of the novel treatment process. Application of the ferrous chloride just after the primary sedimentation basin 26 (and pH adjustment, if needed), and into the headend of the contact chamber 28, which provides for about 1 minute to about 60 minutes of residence or contact time, is sufficient to decrease residual chlorine dioxide and chlorite ion concentrations. Preferably, a contact time of about 2 minutes to about 40 minutes is provided. More preferably, a contact time of about 5 minutes to about 30 minutes is provided. In addition to using a contact chamber 28, it will be appreciated that alternative means such as a sedimentation basin or an extended run of pipe may be utilized to provide sufficient contact time.

Preferably, the ferrous chloride application point 56 and the chlorine application point 60, should be well in advance of the filter 34 and, more preferably, in advance of the secondary sedimentation basin 30. More particularly, when the addition of the ferrous chloride is made just prior to the filter 34 (i.e., without providing for sedimentation), the filter 34 quickly becomes loaded with insoluble iron which may be unacceptable for cost-effective treatment operations. Accordingly, in order to decrease chlorine dioxide and chlorite ion concentrations, allowances should be made to provide for the addition of the ferrous chloride, sufficient contact time, and the chlorine addition, downstream of a primary sedimentation basin 26, and prior to a secondary sedimentation basin 30.

The applicants have also found that by very closely monitoring and controlling other treatment plant processes, the formation of an additional disinfection by-product may be significantly minimized. Specifically, controlling the pH range between pH 6.0 and pH 7.5 at the point of the ferrous chloride application significantly reduces the possibility of chlorate ion formation. Also, by minimizing the amount of sunlight, fluorescent lighting, and/or oxidizing agents to which the chlorine dioxide treated water is subjected to prior to the application of ferrous chloride, further decreases in the formation of chlorate ion may be achieved.

As stated above relative to the contactor chamber 28, it will be appreciated that the present invention contemplates the use of alternative means for the primary sedimentation basin 26 and/or the secondary sedimentation basin 30. Such alternative means include, for example, a lengthy run of piping that allows for sufficient contact time for chemical reactions to occur. However, relative to eliminating the secondary sedimentation basin 30, this alternative approach may require more frequent cleaning of the filter 34, and relative to eliminating the primary sedimentation basin 26, a higher quality water source may be required.

Water processed in accordance with the teachings of the present invention exhibits combined residual levels of chlorine dioxide and chlorite ion by-products of less than 1 ppm, preferably less than 0.2 ppm, and more preferably the water is substantially free of residual chlorine dioxide and chlorite ion by-products.

By way of illustration and not by any limitation, the following example will describe a specific use of ferrous chloride in a water treatment facility within the scope of the present invention.

EXAMPLE I

In a water treatment facility like that shown in FIG. 1, chlorine dioxide is added to the water at a rate of 3 mg/L prior to screen 12. Ferrous chloride is added at point 56 in the facility. The ferrous chloride is 27%–35% ferrous chloride available from Midland Resources, Inc. of St. Louis, Mo. The ferrous chloride is added at a ratio of twelvefold weight-to-weight excess of ferrous chloride to that of the total combined chlorine dioxide and chlorite ion residual contained in the water at the point of the ferrous chloride addition 56. The water is maintained at a pH of 7.0 at the point which the ferrous chloride is added. Prior to the addition of the ferrous chloride, the chlorine dioxide treated water is exposed to substantially no light. The flow rate of the water and the size of the contact chamber 28 is such that 15 minutes of contact time is provided. Chlorine is then added at point 60 to provide a residual chlorine level of 2 mg/L. Basin 30 is sufficiently sized that substantially all of the insoluble iron is captured in basin 30, and not filter 34.

As used herein this specification and the claims below, the reference to residual chlorine levels and residual concentrations of chlorine means the total chlorine residual (i.e., the total amount of free and combined chlorine).

Although the invention has been shown and described with respect to preferred embodiments, it is obvious that equivalent alterations and modifications will occur to others skilled in the art upon reading and understanding the specifications. The present invention includes all such equivalent alterations and modifications, and is limited only by the scope of the following claims.

We claim:

1. A method of treating drinking water to decrease residual concentrations of chlorine dioxide or chlorite ion contained within such water comprising:
   (A) providing a water treatment plant having: (i) a source of chlorine dioxide for treating such water; (ii) a sedimentation operation for treating such water; (iii) a contactor located prior to such sedimentation operation; and (iv) a filtering operation for processing such water located subsequent to such sedimentation operation;
   (B) providing a source of ferrous chloride;
   (C) providing a source of an oxidizing agent for the oxidation of residual ferrous chloride;
   (D) treating such water with such ferrous chloride prior to such sedimentation operation; and
   (E) treating such water with such oxidizing agent after it has been treated with such ferrous chloride and prior to such sedimentation operation.

2. A method as set forth in claim 1 wherein such ferrous chloride in said step (D) is provided for treatment of such water at a ratio of about threefold to about thirtyfold weight-to-weight excess of such ferrous chloride to that of the total combined residuals of chlorine dioxide and chlorite ion present in such water at the point of the ferrous chloride addition.

3. A method as set forth in claim 1 wherein such ferrous chloride in said step (D) is provided for treatment of such water at a ratio of about fivefold to about twentyfold weight-to-weight excess of such ferrous chloride to that of the total combined residuals of chlorine dioxide and chlorite ion present in such water at the point of the ferrous chloride addition.

4. A method as set forth in claim 1 wherein such ferrous chloride in said step (D) is provided for treatment of such water at a ratio of about tenfold to about fifteenfold weight-to-weight excess of such ferrous chloride to that of the total combined residuals of chlorine dioxide and chlorite ion present in the water at the point of the ferrous chloride addition.

5. A method as set forth in claim 1 wherein such contactor comprises a contact chamber.

6. A method as set forth in claim 1 wherein such contactor comprises an extended length of piping through which such water flows.

7. A method as set forth in claim 1 wherein such oxidizing agent comprises chlorine.

8. A method as set forth in claim 1 wherein such contactor provides a contact period of from about 1 minute to about 60 minutes.

9. A method as set forth in claim 1 wherein such contactor provides a contact period of from about 2 minutes to about 40 minutes.

10. A method as set forth in claim 1 wherein such contactor provides a contact period of from about 5 minutes to about 30 minutes.

11. A method as set forth in claim 1 wherein such chlorine is added to such water to provide a residual concentration of from about 0.1 mg/L to about 10 mg/L.

12. A method as set forth in claim 1 including the step of minimizing the amount of lighting to which the water is exposed after treatment with such chlorine dioxide and prior to application of such ferrous chloride.

13. A water treatment facility for converting a source of water into drinking water comprising:
(A) a first sedimentation operation for processing such water and a second sedimentation operation for processing such water subsequent to said first sedimentation operation;
(B) a filter for processing such water after such water has been processed by said second sedimentation operation;
(C) a source of ferrous chloride for treating such water subsequent to said first sedimentation operation and prior to said second sedimentation operation for purposes of decreasing residual amounts of chlorine dioxide or related chlorite ion contained in such water;
(D) a source of an oxidizing agent for treating such water after such source of ferrous chloride and prior to said second sedimentation basin; and
(E) means for providing an adequate amount of time for such water to remain in contact with said ferrous chloride located prior to said second sedimentation basin and prior to the addition of said oxidizing agent to such water.

14. A water treatment facility as set forth in claim 13 wherein said oxidizing agent comprises chlorine and such first sedimentation operation comprises a sedimentation basin.

* * * * *